United States Patent
Abramov et al.

(10) Patent No.: US 8,470,270 B2
(45) Date of Patent: Jun. 25, 2013

(54) METHOD FOR EXTRACTING RARE EARTH ELEMENTS FROM PHOSPHOGYPSUM

(75) Inventors: Yakov Kuzmich Abramov, Moscow (RU); Vladimir Mihailovich Veselov, Moscow (RU); Viktor Mihailovich Zalevsky, Moscow (RU); Nikolay Dmitrievich argunov, Moscow (RU); Lidija Petrovna Bogdanova, Moscow (RU); Nikolay Aleksandrovich Gukasov, Moscow (RU); Vladimir Dmitrievich Evdokimov, Moscow (RU); Vitaly Grigorevich Tamurka, Moscow (RU); Ljubov Viktorovna Motovilova, Moscow (RU)

(73) Assignee: Twin Trading Company (RU)

( * ) Notice: Subject to any disclaimer, the term of this patent is extended or adjusted under 35 U.S.C. 154(b) by 28 days.

(21) Appl. No.: 13/384,229

(22) PCT Filed: Sep. 14, 2010

(86) PCT No.: PCT/RU2010/000504
§ 371 (c)(1), (2), (4) Date: Jan. 14, 2012

(87) PCT Pub. No.: WO2011/008137
PCT Pub. Date: Jan. 20, 2011

(65) Prior Publication Data
US 2012/0114538 A1    May 10, 2012

(51) Int. Cl.
*C01F 17/00* (2006.01)
(52) U.S. Cl.
USPC ........................................ 423/21.5; 423/21.1
(58) Field of Classification Search
USPC ............................................... 423/21.1, 21.5
See application file for complete search history.

(56) References Cited

U.S. PATENT DOCUMENTS

| | | | | |
|---|---|---|---|---|
| 5,011,665 A | * | 4/1991 | Cailly et al. | 423/21.5 |
| 2009/0168591 A1 | * | 7/2009 | Wenzel et al. | 366/116 |

FOREIGN PATENT DOCUMENTS

| | | | |
|---|---|---|---|
| CN | 101012503 A | * | 8/2007 |
| EP | 0265547 | | 5/1988 |
| PL | 155815 | | 6/1993 |
| RU | 2225892 | | 3/2004 |
| RU | 2293781 C | | 2/2007 |
| RU | 2337897 | | 11/2008 |
| SU | 1564152 A | * | 5/1990 |
| ZA | 8903025 A | * | 1/1990 |

OTHER PUBLICATIONS

V.D. Kosynkin et al. "State of the Art and Development Perspectives of Rare-Earth Industry in Russia" M "Metals", N 1, 2001, p. 35-41 (p. 42, 44 and 49).
E.P. Lokshin et al. "Recovery Issues of Rare Earth Metals During Sulfuric Processing of Khibin Apatite Concentrate" M "Metals", N 1, 200, 1p. 42-50 (p. 37).
L.D. Rosenberg "Ultrasonics", M., 1956, pp. 82, 87 and 90.

* cited by examiner

*Primary Examiner* — Melissa Stalder

(57) ABSTRACT

The present invention relates to methods for recovering rare earth elements, in particular, from phosphogypsum.

The claimed method comprises acidic extraction of rare earth elements from phosphogypsum using sulfuric acid-nitric acid mixture solution at 3.2-1.2 ratio with concentration of 1-3% by weight and at liquids-solids ratio of 4-5 within 8-12 minutes with simultaneous hydroacoustic action on the extraction suspension agent being mixed succeeded by separation of insoluble gypsum from extraction suspension agent and by recovery of rare earth elements from extraction solution using cation-exchange sorption by passing the latter through cation-exchange filter.

The claimed method allows both to increase the recovery rate of rare earth elements and to reduce by half the time of the process accomplished at lower concentrations and with smaller volumes of acidic reagents.

1 Claim, No Drawings

METHOD FOR EXTRACTING RARE EARTH ELEMENTS FROM PHOSPHOGYPSUM

This application is the U.S. national phase application of International Application PCT/RU2010/000504 filed Sep. 14, 2010, which claims the benefit of Russian Patent application No RU 2009127311 FILED Jul. 16, 2009, the entire disclosure of which is incorporated herein by reference.

BACKGROUND OF THE INVENTION

The present invention relates to the method used to recover rare earth elements and, in particular, chemical compounds of rare earth elements from phosphogypsum.

In today's rare earth industry more than 60% of expenses are connected with ore mining and processing. Therefore, it is profitable to use technogenic primary products, where rare earth elements are the minor components being mined from subsurface mineral resources. Apatite phosphogypsum can be used as primary product for such purposes. Phosphogypsum is produced during sulfuric-acid processing of apatite concentrate for manufacturing mineral fertilizers. Phosphogypsum is a product of technogenic origin in contrast to natural gypsum stone consisting of $CaSO_4 \times 2H_2O$. That is the reason why the latter has a considerable amount of impurities which are compounds of rare earth and other elements (8 -19%). The content of rare earth elements is within 0.5-1.1% depending on the composition of apatite concentrate.

There is a known process which relates to the recovery of rare earth elements from phosphogypsum (see RU Patent N 2225892 MPK C22B 59/00) and involves processing of phosphogypsum using 25% sulfuric acid solution. The rate of recovery of rare earth elements is 50.0-60.2%. The time of such sulfuric-acid processing is 3 hours; sulfuric acid concentration is 20-25% by weight with liquids-solids ratio (L:S) equal to 2-3. Crystallization of rare earth elements is carried out by inoculating sulfites of rare earth elements at solids-liquids ratio exceeding 100. Such technology requires that the production involves a large quantity of processing equipment. Besides, the disadvantages of this method include low recovery rate of rare earth elements, a considerable number of processing operations, large volumes of cycling sulfuric acid solutions and time expenditures.

There is another known method (RU Patent N 2337897, MPK C 01F 11/46) which involves extraction of compounds of rare earth elements and phosphor into solution with formation of insoluble gypsum residue containing large quantities of sulfuric and phosphoric acids within 20-25 minutes using processing by 22-30% sulfuric acid solution. The extraction solution also contains double sulfates of rare earth elements with sodium or potassium. The resulted crystalline gypsum is subject to processing by $Ca(OH)_2.CaO$ or $CaCO_3$ in order to deacidify residues of sulfuric and phosphoric acids unless their pH-value exceeds 5. At the same time it is required to control the content of phosphor impurities in spent liquor and, depending on the ratio of their content to residual gypsum humidity, to subject this spent liquor to extraction or purification processes using $TiOSO_4H_2O$ until permissible $P_2O_5$ content is achieved.

This method allows to accomplish extraction of up to 82.1% of rare earth elements into an extraction solution with their further separation by crystallization into concentrate with recovery rate of up to 68.5%.

The disadvantages of this method are the pH-value of the resulted crystalline gypsum which is not in compliance with permissible construction standards as well as high concentration of $P_2O_5$. Separation of lanthanoid elements from the oversaturated extraction solution is rather a time-consuming process (2 hours). Both the content of phosphor impurities in acid extraction agent and residual humidity of gypsum residue should be controlled. In order to remove excess phosphor, special equipment is required for deacidification of phosphorous compounds using dry titanium compounds or a mixture of titanium and concentrated sulfuric acid with further separation of titanyl phosphate and obligatory processing using concentrated sulfuric acid. In case concentration of sulfuric acid in extraction solution is reduced below 22%, sulfuric acid concentration should be recovered in order it can be used again in the process. This will require a large quantity of reactor, capacitive and filtration equipment to be used for extraction of rare earth elements, storage of different extraction solutions and deacidification of phosphorous compounds.

There is a known nitric-acid technology for recovery of rare earth elements from apatite with 85% separation into the solution which also contains phosphor and fluorine (V. D. Kosynkin et al. "State of the Art and Development Perspectives of Rare-Earth Industry in Russia"—"Metals", N 1, 2001).

The most similar to the claimed method is a method for recovering rare earth elements from phosphogypsum (see RF Patent N 2293781, MPK C22B 59/00) which involves processing of phosphogypsum by sulfuric acid with further extraction of rare earth elements into solution, separation of insoluble gypsum residue, increasing content of rare earth elements in oversaturated solution in order to crystallize the concentrate of rare earth elements, separation of the concentrate from spent liquor and its processing. The phosphogypsum is processed using sulfuric acid of 22-30% (by weight) concentration at liquids-solids ratio of 1.8-2.2 within 20-30 minutes in order to avoid spontaneous crystallization of rare earth elements from the solution prior to separation of the insoluble residue. Oversaturation of the solution is achieved due to sodium content of 0.4-1.2 g/l.

The disadvantage of this known method are the need in additional reagents, high concentrations of acids together with their considerable volumes, a large number of basic technological operations with an insufficient rate of recovery of rare earth elements and total complexity of the method.

SUMMARY OF THE INVENTION

The aim of the invention is to obtain the technical result of increasing efficiency of extraction recovery of rare earth elements from phosphogypsum due to the reduction of accessory reagents, weakening of acidic reagent and also by reducing basic technological operations together with increasing rate of recovery of rare earth elements into extraction solution and simplifying the method.

The technical result is achieved by that according to the invention in the method for recovering rare earth elements from phosphogypsum including acidic extraction of rare earth elements from phosphogypsum while mixing extraction suspension agent, separation of insoluble residue of crystalline phosphogypsum from extraction solution and recovery of rare earth elements from extraction solution, the acidic extraction is carried out using sulfuric acid-nitric acid mixture at 3.2-1.2 ratio with concentration of 1-3% by weight at liquids-solids ratio (L:S) of 4-5 within 8-12 minutes while producing simultaneous hydroacoustic effect on the extraction suspension agent being mixed, and the recovery of rare earth elements from the extraction solution, in its turn, is performed using cation-exchange sorption by passing the extraction solution through a cation-exchange filter.

The extraction solution free from rare earth elements can be regenerated for further use at the stage of phosphogypsum acidic extraction, and rare earth elements bound with sorbents from the cation-exchange filter are separated when the latter is being regenerated.

As it is proved by experiments, the acidic wastes formed while producing nitro-cellulose can be used as sulfuric acid-nitric acid mixture.

DETAILED DESCRIPTION OF THE EXEMPLARY EMBODIMENTS

The essential features of the claimed invention enabling the achievement of the technical result are as follows.

When phosphogypsum is being processed using sulfuric acid-nitric acid mixture, rare earth elements are interacting with sulfuric and nitric acids. As a result of the interaction with sulfuric acid rear earth elements dissolve within 10 minutes, and at the same time sodium and potassium cations from phosphogypsum go into the solution and form double sulfates with rare earth elements in it. The solubility of double sulfates of both—sodium with rare earth elements and potassium with rare earth elements—is low in sulfuric solutions (see E. P. Lokshin et al. "Recovery Issues of Rare Earth Metals During Sulfuric Processing of Khibin Apatite Concentrate"—"Metals", N 1, 2001) and good—in nitric acid.

It is proved by experiments that specific ratios and concentrations of the mixture of the above acids together with simultaneous hydroacoustic action provide conditions for more complete recovery of rare earth elements from phosphogypsum.

Acid extraction performed at liquids-solids ratio of 4-5 using sulfuric acid-nitric acid mixture excludes the possibility of crystallization of rare earth elements prior to gypsum separation and is also optimal to enable stable mixing of suspension agent in an extractor and also when the agent goes through a rotary-oscillatory device. The use of the mixture of sulfuric and nitric acids contributes to complete separation of other impurities from gypsum crystals.

The optimal time (8-12 minutes) required for interaction of compounds of rare earth elements and other impurities with sulfuric and nitric acids is enabled due to constant hydroacoustic action on phosphogypsum extraction suspension agent. The suspension agent goes through the working elements of the rotary-oscillatory device, and gypsum undergoes intensive mechanical grinding to have 10-15 μm particles and is subject to cavitation at the parameters corresponding to ultrasonic frequencies. This is ensured, in particular, by the operational mode of the rotary-oscillatory device with its working elements of 150-250 mm diameter and rotor speed of 50 Hz. The said parameters in the rotary-oscillatory device produce an intensive effect on the suspension agent in labyrinth spaces between its rotor and stator (10-15 μm), and together with mechanical fracture of crystals cavitation occurs making mass-transfer processes considerably quicker. Such ultrasonic exposure is known to be used to make physical and chemical processes more intense (see L. D. Rosenberg "Ultrasonics", M., 1956).

After the extraction process is finished, the suspension agent is being decanted to a separating unit, e.g. a centrifugal separator or filter where crystalline gypsum will be separated from the solution.

The solution is supplied to a cation-exchange filter containing compounds which sorb the compounds of rare earth elements and phosphor. The solution leaving the cation-exchange filter is a water solution of sulfuric and nitric acids and can be used in the process again after the proportion of acids is recovered. The residue of rare earth elements is separated from the working surface of cation-exchange filter, and the filter can be used for further sorption of rare earth elements.

The use of the mixture of the so-called acidic wastes formed while producing nitro-cellulose using different methods has been proved by experiments. The experimental results have shown that the rate of recovery of rare earth elements is close to the rate obtained while using acids of 3% by weight concentrations.

The above features of the present invention ensure realization of the method and allow to reduce reagent quantity and consumption as well as the time required for the technological process and loading of basic units. They also help to increase the recovery rate of rare earth elements and optimize the technological process in general.

The essence of the claimed method can be understood from the following examples.

EXAMPLES

Example 1

100 kg of dump (apatite) phosphogypsum containing 0.45% of rare earth elements is processed while being mixed in a bulk-capacity tank-extractor using 1% by weight solution of sulfuric acid-nitric acid mixture at liquids-solids ratio of 5 within 10 minutes. The sulfuric and nitric acids are contained in the mixture in the ratio of 3:1 (parts by weight), correspondingly. During the extraction process the suspension agent is being mixed and subject to hydroacoustic exposure at the same time when it circulates through a rotary-oscillatory device within 10 minutes. These parameters ensure the required stability of the suspension agent and the hydroacoustic action produced on it. The rotor diameter of the rotary-oscillatory device is 150 mm, its rotational frequency is 50 Hz and feed rate is 5 m$^3$/h. In order to separate the solution from crystalline phosphogypsum the resulted suspension agent is processed in a centrifuge.

The analysis of samples using ICPMS (inductively coupled plasma mass spectrometry) has shown the rate of recovery of rare earth elements equal to 86.1%.

The solution containing rare earth elements is passed through the cation-exchange filter. The concentrate of rare earth elements on the cation-exchange filter is a resulting product of the method. The recovery rate was 86.1%. The acidic extracting agent (after it has passed through the cation-exchange filter and regenerated) is reused.

The recovery rate of rare earth elements based on the performed experiments is shown in the table below.

| Sulfuric acid-nitric acid ratio (parts by weight) | Recovery rate of rare earth elements, % | | | | | | | | |
|---|---|---|---|---|---|---|---|---|---|
| | Concentration of acids mixture in extractor, % | | | Liquids-solids (L:S) ratio (solution-phosphogypsum) | | | Mixing time of suspension agent in extractor, min | | |
| | 1 | 2 | 3 | 4 | 4.5 | 5 | 8 | 10 | 12 |
| 1.2 | 85.0 | 85.1 | 85.4 | 85.0 | 85.1 | 85.3 | 85.0 | 85.1 | 85.1 |
| 2.0 | 85.6 | 85.7 | 86.0 | 85.4 | 85.8 | 85.9 | 85.8 | 85.8 | 85.9 |
| 3.2 | 86.0 | 86.1 | 86.3 | 85.8 | 86.1 | 86.1 | 86.0 | 86.1 | 86.1 |

As it can be seen from the above examples and the table, the claimed method allows to increase the rate of recovery of rare earth elements from phosphogypsum up to 85-86.1% and reduce by half the time of extraction process, to use less reagents at lower concentrations and smaller volumes of acidic reagents as well as to reduce a number of technological operations.

The claimed method is available for industrial application, provided that standard equipment in combination with both rotary-oscillatory device and a cation-exchange filter is used.

TABLE

| N | Element | Initial sample Content, mg | Initial sample Content, % | Content in residue after extraction, mg Example 2 | Content in residue after extraction, mg Example 1 |
|---|---|---|---|---|---|
| 1 | Ce | 123.5 | 28.2 | 41.0 | 21.4 |
| 2 | La | 168.4 | 38.4 | 40.0 | 22.8 |
| 3 | Nd | 32.7 | 7.5 | 6.5 | 5.0 |
| 4 | Pr | 53.8 | 12.3 | 12.6 | 8.47 |
| 5 | Sm | 9.0 | 2.05 | 1.35 | 0.9 |
| 6 | Gd | 8.5 | 1.94 | 1.70 | 0.85 |
| 7 | Dy | 9.0 | 2.05 | 1.50 | 0.75 |
| 8 | Tb | 1.7 | 0.39 | 0.5 | — |
| 9 | Er | 4.0 | 0.91 | — | — |
| 10 | Yb | 4.5 | 1.02 | — | — |
| 11 | Eu | 3.5 | 0.80 | 0.85 | 0.61 |
| 12 | Y | 16.4 | 3.74 | 6.56 | 0.16 |
| 13 | Tm | 3.1 | 0.7 | — | — |
| | Total | 438.1 | 100 | 112.06 | 60.9 |
| | Amount of recovered rare earth elements, mg | | | 326.04 | 377.2 |

TABLE-continued

| N | Element | Initial sample Content, mg | Initial sample Content, % | Content in residue after extraction, mg Example 2 | Content in residue after extraction, mg Example 1 |
|---|---|---|---|---|---|
| | Recovery rate, % | | | 74.4 | 86.1 |

The invention claimed is:

1. A method for extracting of rare earth elements from phosphogypsum by means of acid extraction, comprising
   mixing of phosphogypsum with a solution of mixture of sulfuric and nitric acid in a ratio from 3.2:1 to 1.2:1 by mass parts, with the concentration of each of them from 1 to 3 wt. %, with the ratio of "liquid:solid" from 4:1 to 5:1 weight parts during from 8 to 12 minutes to form a suspension,
   mixing the suspension,
   hydroacoustic effecting on the suspension simultaneously with its mixing by means of circulation the suspension through a rotary-oscillatory device with grinding of phosphogysum particles to a size from 10 to 15 microns,
   separating from the suspension of insoluble precipitate and obtaining an extraction solution and extracting compounds of rare earth elements from the extraction solution by means of passing the extraction solution through the cation-exchange filter.

* * * * *